United States Patent
Saito et al.

(10) Patent No.: US 8,765,066 B2
(45) Date of Patent: *Jul. 1, 2014

(54) DEVICE AND METHOD FOR PROCESSING CEMENT KILN COMBUSTION EXHAUST GAS

(71) Applicants: Taiheiyo Cement Corporation, Tokyo (JP); Nippon Shokubai Co., Ltd., Hmeji (JP)

(72) Inventors: Shinichiro Saito, Kumagaya (JP); Yasuhiro Uchiyama, Ageo (JP); Junichi Terasaki, Kumagaya (JP); Hisashi Kondo, Kumagaya (JP); Mitsuharu Hagi, Tatsuno (JP); Shinyuki Masaki, Hmeji (JP)

(73) Assignees: Taiheiyo Cement Corporation (JP); Nippon Shokubai Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,211

(22) Filed: May 15, 2013

(65) Prior Publication Data

US 2013/0251599 A1 Sep. 26, 2013

Related U.S. Application Data

(62) Division of application No. 11/794,820, filed as application No. PCT/JP2005/023859 on Dec. 27, 2005, now Pat. No. 8,470,273.

(30) Foreign Application Priority Data

Jan. 6, 2005 (JP) .................................. 2005-001496

(51) Int. Cl.
- *B01D 53/56* (2006.01)
- *B01D 53/75* (2006.01)
- *B01D 53/86* (2006.01)

(52) U.S. Cl.
USPC ............................. 422/169; 422/172; 422/234

(58) Field of Classification Search
USPC ......... 422/168, 169, 172, 180, 234, 611, 612; 110/215; 96/234
See application file for complete search history.

(56) References Cited

U.S. PATENT DOCUMENTS 4,366,133 A * 12/1982 Rader et al. .............. 423/243.02

(Continued)

FOREIGN PATENT DOCUMENTS

| DE | 103 16 784 A1 | 10/2004 |
| EP | 0 826 408 B1 | 3/1998 |

(Continued)

OTHER PUBLICATIONS

Extended/Supplementary European Search Report for Patent Application No. EP 05822629.1 (PCT/JP2005023859). Nov. 4, 2013; 7 pages.

*Primary Examiner* — Jill Warden
*Assistant Examiner* — Joye L Woodard
(74) *Attorney, Agent, or Firm* — Stetina Brunda Garred & Brucker

(57) ABSTRACT

A combustion exhaust gas processing device comprises: a dust collector collecting dust in a cement kiln combustion exhaust gas; a wet dust collector using sodium hypochlorite as a catalyst-poisoning-substance stripper for removing a catalyst-poisoning substance and mercury from a combustion exhaust gas which passed the dust collector; heaters downstream of the wet dust collector for heating the combustion exhaust gas from the wet dust collector; and a catalyst device from which NOx, a persistent organic pollutant, etc. in the heated combustion exhaust gas, are removed. An upstream side of the catalyst device is installed with an oxide catalyst such as titanium-vanadium and a downstream side is installed with a platinum catalyst as a noble-metal catalyst. The temperature of the combustion exhaust gas after the wet dust collector is increased up to 140° C. or more with the heaters to prevent decline in denitration efficiency of and the decomposition efficiency of a volatile organic compound. A mercury adsorbing tower is provided for adsorbing the mercury in liquid exhausted from the wet dust collector and wastewater from the liquid is used to generate sodium hypochlorite for use in the wet dust collector.

13 Claims, 3 Drawing Sheets

(56) References Cited

U.S. PATENT DOCUMENTS

| | | | |
|---|---|---|---|
| 5,120,695 A * | 6/1992 | Blumrich et al. | 502/78 |
| 6,156,277 A * | 12/2000 | Leibacher et al. | 422/168 |
| 6,203,598 B1 * | 3/2001 | Hasegawa et al. | 95/235 |
| 7,799,297 B2 * | 9/2010 | Saito | 422/168 |
| 2004/0166043 A1 | 8/2004 | Vandine et al. | |

FOREIGN PATENT DOCUMENTS

| | | |
|---|---|---|
| JP | 2003251200 | 9/2003 |
| WO | 98/25689 | 6/1998 |

\* cited by examiner (a)

(b)

DEVICE AND METHOD FOR PROCESSING CEMENT KILN COMBUSTION EXHAUST GAS

CROSS-REFERENCE TO RELATED APPLICATIONS

The present application is a divisional application of U.S. patent application Ser. No. 11/794,820, filed on Jan. 14, 2008, which claims priority to International Application No. PCT/JP2005/23859 which was filed on Dec. 27, 2005 and claims priority to Japanese Patent Application No. 2005-001496 filed Jan. 6, 2005.

STATEMENT RE: FEDERALLY SPONSORED RESEARCH

Not Applicable

BACKGROUND OF THE INVENTION

1. Technical Field

The present invention relates to a device and a method for processing cement kiln combustion exhaust gas to remove harmful substances such as dust, NOx, persistent organic pollutants including dioxins, a volatile organic compound and CO.

2. Background Art

As shown in FIG. 2, a cement burning facility 21 comprises a preheater 22, a calciner 23, a cement kiln 24, a clinker cooler 25 and so on, and cement raw meal R, which is fed to the preheater 22 from raw material supplying system, is preheated in the preheater 22, calcined in the calciner 23, burned in the cement kiln 24, and produced clinker is cooled in the clinker cooler 25. Here, the combustion exhaust gas from the cement kiln 24 is processed through desulferization in the preheater 22 and dust collection using an electric precipitator 26 since limestone as a main raw material has a property to adsorb SOx, and processed combustion exhaust gas is discharged in the atmosphere through a fan 27 and a stack 28.

Although there was not much harmful substance contained in the combustion exhaust gas from the cement kiln 24, such as alkali, chlorine, sulfur, and heavy metal and so on, since it is expected, with the increase in the amount of recycle raw materials and fuels processed by a cement manufacturing facility in recent years and a future increase plan, that the amount of the harmful substance increases, there is a possibility of becoming a problem from now on.

Then, in order to remove the above-mentioned harmful substances, for example, a technology is described in the first patent document. This technology comprises the steps of: bleeding a part of combustion exhaust gas from the inlet hood of a cement kiln; supplying cooling air to the bled gas to cool it to 600-800° C.; introducing the cooled exhaust gas into a cyclone to catch coarse grain dust through separation; introducing the caught coarse grain dust to the kiln inlet hood for circulation; introducing a part of cyclone exhaust gas to the kiln inlet hood to recover heat of the remainder of cyclone exhaust gas; and feeding the exhaust gas to a dust collector to remove fine grain dust.

Furthermore, for the same object as the above, a technology is described in the second patent document. This technology comprises the steps of: sampling preheated raw meal introduced to a kiln inlet hood to analyze the content of harmful substance therein; controlling the amount of emission that circulates from a cyclone to a kiln inlet hood so that an analysis result becomes desired value; controlling a cooling air flow rate so that cyclone inlet gas temperature becomes in the range of 600-800° C.; and simultaneously detecting the cooling air flow rate and the amount of the emission, and controlling the amount so that the amount of emission discharged out of a system from the dust collector becomes approximately equal to the cooling air flow rate.

Moreover, a technology is described in the third patent document, which comprises the steps of: supplying fuel from a fuel-supply opening, and waste containing ammonium nitrogen from the fuel-supply opening and/or its neighborhood to burn them; and introducing gas containing ammonia into a part of 700° C. or more in the phase before burning the waste containing ammonium nitrogen to reduce the amount of NOx generated and not to sprinkle offensive odor at the suppression of the NOx.

Furthermore, in the forth patent document, in order to effectively collect low-melting compounds from the exhaust gas of cement burning facility, a method and a device are disclosed, in which a part of exhaust gas is bled from cement burning facility to collect low-melting compounds; then the temperature of the bled exhaust gas is brought to 1100-1500° C.; and then the bled exhaust gas is quenched to 120-600° C. to collect the low-melting compounds.

Patent document 1: Japanese Patent Publication No. Heisei11-130489 gazette
Patent document 2: Japanese Patent Publication No. Heisei11-130490 gazette
Patent document 3: Japanese Patent Publication No. 2000-130742 gazette
Patent document 4: Japanese Patent Publication No. 2003-277106 gazette

BRIEF SUMMARY OF THE INVENTION

Figure 1:
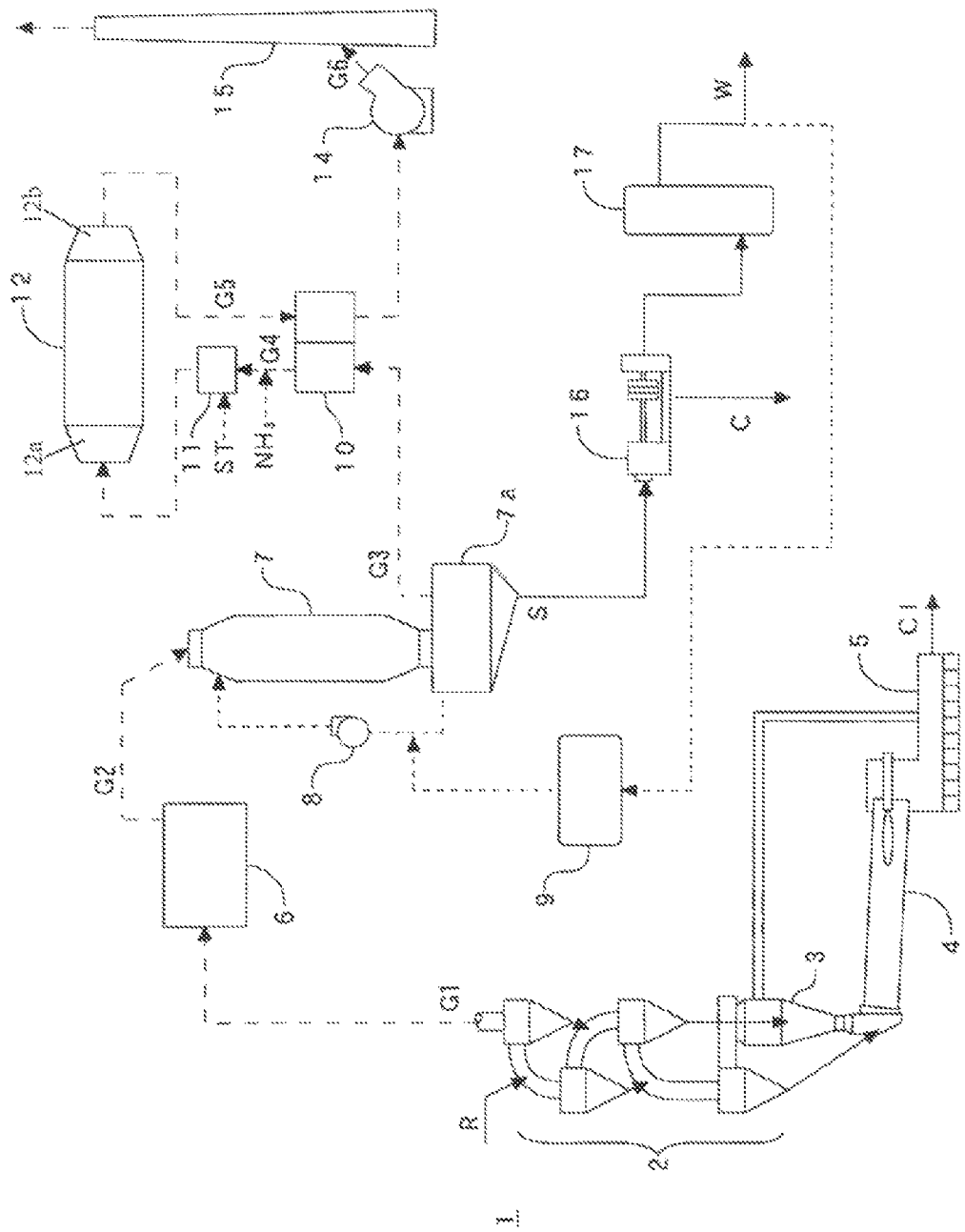
FIG. 1 is a flow chart showing an embodiment of a combustion-exhaust-gas processing device according to the present invention.
Figure 2:
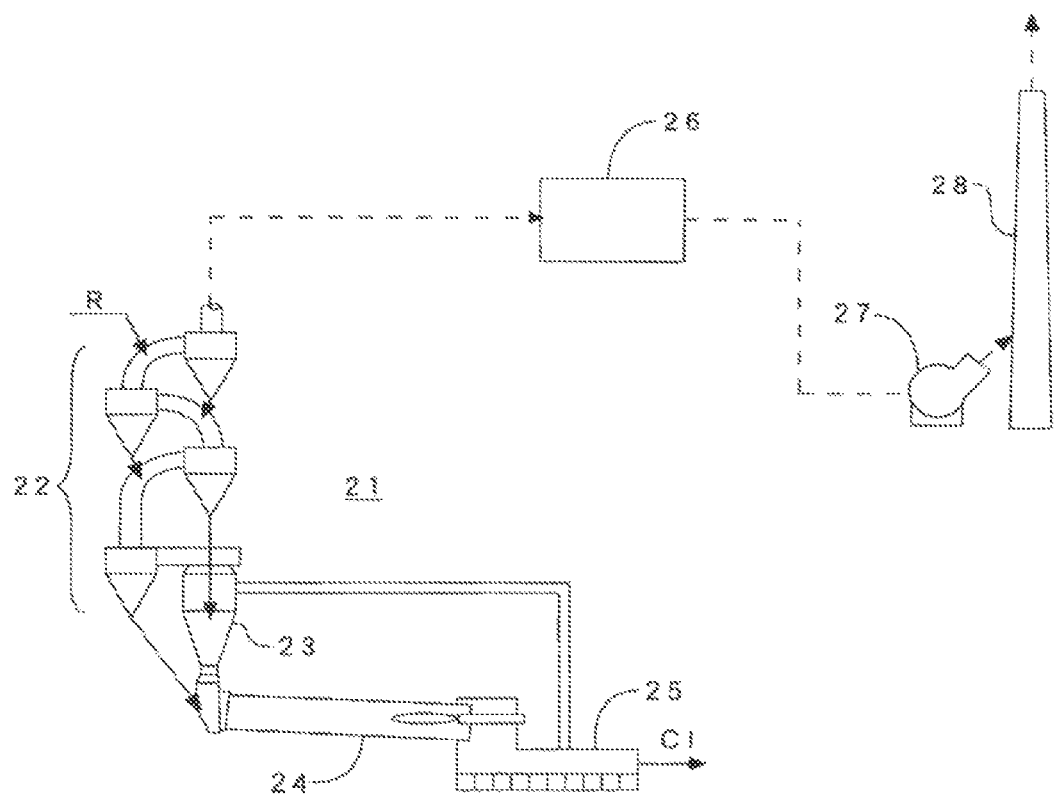
FIG. 2 is a flow chart showing an example of a conventional cement burning facility.

Problems to be Solved by the Invention

As mentioned above, although harmful substances, such as heavy metal discharged with the combustion exhaust gas from a cement kiln, do not pose a problem quantitatively until now, various recycle raw materials and fuels are fed into the cement burning facility in response to the request of a recycled-resources activity in recent years, and when the input of recycled resources will continue increasing from now on, the amount of emission of the harmful substances increases, and there is a possibility of becoming a problem. Moreover, since the combustion exhaust gas, which occurs with a cement burning facility is abundant, a clarifying facility of the harmful substances will also become large-scale, and will have a possibility that facility cost and operating cost may increase.

It is therefore the object of the present invention to provide a device and a method for processing combustion exhaust gas which can efficiently remove the harmful substance in cement kiln combustion exhaust gas, holding down facility cost and operating cost low.

Means for Solving the Problem

To solve the above problem, the present invention is a device for processing cement kiln combustion exhaust gas characterized in that the device comprises: a dust collector collecting dust in cement kiln combustion exhaust gas; a catalyst-poisoning-substance stripper removing a catalyst-poisoning substance from the cement kiln combustion exhaust gas that passed the dust collector, a preheater heating beforehand the cement kiln combustion exhaust gas that passed the catalyst-poisoning-substance stripper; and a catalyst device removing at least one selected from nitrogen oxide, a volatile organic compound, carbon monoxide, a persistent organic pollutant, hydrocarbon and an offensive odor substance in the cement kiln combustion exhaust gas preheated by the preheater. Here, the persistent organic pollutants (POPs) are, for example, PCB (polychlorinated biphenyl) and dioxin, which remain in environment by resistance to decompose and affect people's health and ecosystem. Further, the hydrocarbon and the offensive odor substance are saturated aliphatic hydrocarbon, unsaturated aliphatic hydrocarbon and aldehydes, alcohols, ketone, a fatty acid group, ester species, a sulfur compound, amines, and other nitrogen compounds, specifically, such as ammonia, methyl mercaptan, hydrogen sulfide, methyl sulfide, methyl disulfides, trimethylamine, acetaldehyde, propionaldehyde, normal butyraldehyde, isobutyraldehyde, normal valeraldehyde, isovaleraldehyde, isobutanol, ethyl acetate, methyl isobutyl ketone, toluene, styrene, xylene, propionic acid, normal butyric acid, normal valeric acid, isovaleric acid and so on.

With the present invention comprising the steps of: collecting dust in cement kiln combustion exhaust gas with a dust collector; removing a catalyst-poisoning substance from the combustion exhaust gas by a catalyst-poisoning-substance stripper; preheating the combustion exhaust gas with a preheater; and removing at least one selected from nitrogen oxide, a volatile organic compound, carbon monoxide, a persistent organic pollutant, hydrocarbon and an offensive odor substance in the cement kiln combustion exhaust gas, harmful substances can be removed from cement kiln combustion exhaust gas without a large-scale facility, and the operating cost for removing harmful substance can also be held down low.

In the device for processing cement kiln combustion exhaust gas, the catalyst-poisoning-substance stripper can be a wet dust collector that removes a catalyst-poisoning substance from the combustion exhaust gas, preferably a scrubber adding sodium hypochlorite to the cement kiln combustion exhaust gas or a bag filter for which dust is collected while blowing activated carbon into the cement kiln combustion exhaust gas. With the scrubber adding sodium hypochlorite to the cement kiln combustion exhaust gas, hydrogen chloride as a catalyst-poisoning substance is removed with being dissolved in water, dust can be collected with the scrubber, and mercury as a heavy metal can also be removed efficiently. Moreover, by using the bag filter for which dust is collected while blowing activated carbon into cement kiln combustion exhaust gas, or the activated carbon filter filled up with activated carbon, as a catalyst-poisoning-substance stripper, dust and mercury as a catalyst-poisoning substances can be removed efficiently, and SOx can also be removed.

In the device for processing cement kiln combustion exhaust gas, the concentration of the sodium hypochlorite is preferably in a range of 1 mg/L or more and 1,000 mg/L or less. When the concentration of the sodium hypochlorite added is less than 1 mg/L, the elimination factor of catalyst-poisoning components, such as Hg, Ca, K, and dust, which are catalyst-poisoning substances, falls, and the coating weight of the catalyst-poisoning substances increases, resulting in decreased durability of the catalyst. On the other hand, even if the concentration of the added sodium hypochlorite liquid exceeds 1,000 mg/L, the elimination factor of the catalyst-poisoning substances reaches saturation, and the effect beyond this cannot be expected.

In the device for processing cement kiln combustion exhaust gas, the catalyst device may be provided with an oxide catalyst such as a titanium-vanadium catalyst upstream of the catalyst device, and a noble-metal catalyst having at least one noble metal selected from platinum, palladium, rhodium and ruthenium downstream thereof. And, a reducing agent is preferably sprayed from an entrance-side upper part of the catalyst device.

There is no denying that cement kiln combustion exhaust gas contains harmful substances such as NOx, carbon monoxide, persistent organic pollutants, volatile organic compounds in low concentration but over many components. In the method of processing the cement kiln exhaust gas using a catalyst, on the catalyst arrangement in a catalyst device, it is more desirable to arrange an oxidation catalyst upstream and to arrange a noble-metal catalyst downstream rather than to arrange a noble-metal catalyst upstream and to arrange an oxidation catalyst downstream. Treatment of NOx and volatile organic compounds becomes effective especially by taking the form which sprays $NH_3$ from the inlet-port upstream part of a catalytic reaction device; arranges an oxidation catalyst in a catalytic reaction device to the upstream; and arranges a noble-metal catalyst to the downstream thereof. By the reverse pattern for the arrangement in a catalyst that a noble-metal catalyst is arranged upstream, and an oxidation catalyst downstream, while the removal performance of NOx falls, deodorizing performance also worsens notably.

Further, the mesh size (bore diameter) of the oxide catalyst, such as a titanium-vanadium catalyst and of the noble-metal catalyst having platinum, palladium, rhodium or ruthenium may be 1.75 mm or more and 3.75 mm or less, more preferably 1.75 mm or more and 2.90 mm or less. The catalyst-poisoning-substance stripper will remove poisoning mist and poisoning dust; blinding by the mist and dust of the catalyst will be avoided; and durability will also improve because coating weight of the poisoning object decreases. With the catalyst of the mesh size (bore diameter) of greater than 3.75 mm, although the blinding by mist and dust becomes more difficult to occur, since the contact area of exhaust gas decreases, the amount of required catalysts increases, and it becomes disadvantageous economically. On the other hand, if the mesh size (bore diameter) of a catalyst is less than 1.75 mm, although the contact area of exhaust gas will become large, and the amount of required catalysts effectively decreases, the pressure loss of exhaust gas defectively increases, and the poisoning mist and poisoning dust which cannot be further removed by a poisoning substance stripper will come flying, which will become a cause of the blinding of a catalyst, and its durability will also fall.

In the device for processing cement kiln combustion exhaust gas, the preheater may be a Ljungstrom-type heat exchanger, a heat pump or a heat pipe. With this construction, heat recovery efficiency rises and the facility cost of this processing device can be reduced substantially.

Further, the present invention is a method for processing cement kiln combustion exhaust gas characterized in that the method comprising the steps of: collecting dust in cement kiln combustion exhaust gas; removing a catalyst-poisoning substance from the cement kiln combustion exhaust gas of which dust is collected; heating the cement kiln combustion exhaust gas of which catalyst-poisoning substance is removed up to 140° C. or more; and removing with a catalyst at least one selected from nitrogen oxide, a volatile organic compound, carbon monoxide, a persistent organic pollutant, hydrocarbon and an offensive odor substance. In order to prevent decline in denitration efficiency and the decomposition efficiency of a volatile organic compound, the temperature of the combustion exhaust gas after the catalyst-poisoning substances is removed is increased up to 140° C. or more, and as mentioned above, without a large-scale facility, harmful substance can be removed from cement kiln combustion exhaust gas, and it becomes possible to suppress the operating cost for removing harmful substance to low.

In the method for processing cement kiln combustion exhaust gas, in accordance with concentration of nitrogen oxide in the cement kiln combustion exhaust gas, whether ammonia gas can be added to the combustion exhaust gas after the catalyst-poisoning substance is removed, or aqueous ammonia or urea water may be added to the combustion exhaust gas of 140° C. or more and then the combustion exhaust gas passes the catalyst. With this method, while rationalizing the amount of the ammonia used, the amount of the ammonia discharged out of the system can be stopped to the minimum.

Further, in the above method, the combustion exhaust gas after the catalyst-poisoning substances is removed is controlled to be 140° C. or more using heat recovered from the combustion exhaust gas passed the catalyst or/and steam generated by remaining heat in a plant with the cement kiln. With this, the combustion exhaust gas from a cement kiln can be processed, using the energy in the plant effectively.

Effect of the Invention

As mentioned above, according to the device and method for processing cement kiln combustion exhaust gas according to the present invention, it becomes possible to efficiently remove harmful substance generated with a cement burning facility, holding down facility cost and operating cost low.

DETAILED DESCRIPTION OF THE INVENTION

The Best Mode to Carry Out the Invention

Next, one embodiment of this invention will be explained referring to FIG. 1. As explained in the column of "Background Art", a cement burning facility 1 comprises a preheater 2, a calciner 3, a cement kiln 4, a clinker cooler 5 and so on, and cement raw meal R is fed to the preheater 2 from raw material supplying system not shown, and cement clinker Cl is produced through preheating in the preheater 2, calcining in the calciner 3, burning in the cement kiln 4. The produced clinker Cl is cooled in the clinker cooler 5 and is ground in a finishing process.

The combustion exhaust gas processing device according to the present invention is disposed downstream of the cement burning facility 1, and comprises an electrostatic precipitator 6 collecting dust in the combustion exhaust gas G1 from the preheater 2; a wet dust collector 7 which collects water-soluble materials, dust, etc. in the combustion exhaust gas G2 discharged from the electrostatic precipitator 6 and functions as a catalyst-poisoning-substance stripper, a sodium hypochlorite generator 9 which supplies sodium hypochlorite to the wet dust collector 7; a heat exchanger 10 and a heater 11 for heating beforehand combustion exhaust gas G3 which passed the wet dust collector 7; a catalyst device 12 removing NOx and persistent organic pollutants such as dioxin in the preheated combustion exhaust gas G4; a solid-liquid separator 16 which carries out solid-liquid separation of the slurry S discharged from the wet dust collector 7; and a mercury adsorbing tower 17 which adsorbs mercury in the fluid separated by the solid-liquid separator 16.

The electrostatic precipitator 6 is installed to collect dust in the combustion exhaust gas G1 from a preheater 2. It is possible to dispose a bag filter in place of the electrostatic precipitator 6, and both of them can be installed together.

The wet dust collector 7 is installed to collect water-soluble materials and dust in the combustion exhaust gas G2 which passed the electrostatic precipitator 6, and the wet dust collector 7 removes dust, sulfuric acid mist, hydrogen chloride (HCl), mercury (Hg), etc as catalyst-poisoning substances which have big effect on the life of the latter catalyst device 12.

Mixing scrubbers (Mu scrubber manufactured by Mu Company Limited etc.) can be used for this wet dust collector 7, for example. Meanwhile, a mixing scrubber is characterized by having arranged two or more diffusers in a cylindrical body, and the mixing scrubber gives turning to the flow of gas and fluid, while the gas and fluid move with a countercurrent or concurrent into the cylinder, and is a device to contact gas and fluid with each other for reaction and dust collection. Preferably, gas and fluid are made concurrent, and the diffusers, which give a right wheel to this flow, and the diffusers, which give a left right wheel to this flow, are arranged by turns. Moreover, in order to avoid that a device is enlarged too much, the residence time of the combustion exhaust gas of the wet dust collector 7 is set between 1 second and 10 seconds.

Under the wet dust collector 7, a circulating liquid tank 7a is arranged, and a pump 8 is disposed between the wet dust collector 7 and the circulating liquid tank 7a, and the slurry generated by the wet dust collector 7 can be circulated through the circulating liquid tank 7a and the pump 8.

The sodium hypochlorite generator 9 is disposed to supply sodium hypochlorite to the wet dust collector 7, and it oxidizes the mercury contained in the combustion exhaust gas G2 with the sodium hypochlorite. It is desirable to use an in-line-polarity-transformation type for the sodium hypochlorite generator 9. This type of generator directly electrolyzes in treated water without salt water.

The heat exchanger 10 performs the heat exchange of the combustion exhaust gas G3 discharged from the circulating liquid tank 7a, and the combustion exhaust gas G5 discharged from the catalyst device 12. It is desirable to use a Ljungstrom (trademark)-type heat exchanger (made by ALSTOM K.K.) for this heat exchanger 10. The Ljungstrom-type heat exchanger heats a heat reservoir directly in heat side gas, and heated gas is also directly warmed. For example, it is prepared, in the core of casing of a body, a disc-shaped heat exchange element pivotally supported, and the heat exchange element has radially many wave steel plate that are mutually laminated and has a clearance mutually, and a heat exchange is performed by passing the combustion exhaust gas G3 discharged from the circulating liquid tank 7a, and the combustion exhaust gas G5 discharged from the catalyst device 12 in the clearance.

The heater 11 is installed to heat the combustion exhaust gas G4 discharged from the heat exchanger 10 using the steam ST generated by remaining heat or the like in the plant in which the cement burning facility 1 is installed. The reason why the combustion exhaust gas G4 is heated is to more effectively perform denitration and decompose persistent organic pollutants such as dioxins. Moreover, ammonia ($NH_3$) used as a NOx reducing agent with the latter catalyst device 12 is added on the entrance side of the heater 11. The reason why ammonia is added upstream of catalyst device 12 is to utilize the mixing effect by the fan 14 or the heater 11, and it can be added between the outlet of the wet dust collector 7 and the inlet of the catalyst device 12, where the above mixing effect is available other than the entrance side of the heater 11.

The catalyst device 12 is installed to decompose and remove NOx and persistent organic pollutants, etc. in the combustion exhaust gas G4 that passed the heat exchanger 10. By forming this catalyst device 12 in the shape of a honeycomb, even when processing a large amount of combustion exhaust gas G4, it can constitute comparatively small.

Next, the catalyst used with the catalyst device 12 is explained in detail. In the catalyst device 12, the catalyst used for the usual exhaust gas treatment can be used, for example, a NOx removal catalyst for exhaust gas can also be used. In the catalyst device 12, a titanium-vanadium catalyst as an oxide catalyst 12$a$ is used upstream, and a platinum or a palladium catalyst or the like as a noble-metal catalyst 12$b$ is used downstream.

A titanium-vanadium catalyst means the catalyst that makes titanium (Ti) and vanadium (V) indispensable. This catalyst exhibits a high function in decomposition clearance of a volatile organic compound as a harmful substance, while having the high decomposition activity (denitration activity) of NOx as a harmful substance.

Furthermore, one or more sorts of metallic oxides selected from tungsten (W), molybdenum (Mo), silicon (Si), zirconia (Zr) can be used collectively. Preferably, the independent oxide of Ti, it is using still more preferably one or more sorts selected from titanium (Ti), silicon (Si) and zirconia (Zr) of metallic oxides, and two element-system multiple oxide of Ti and Si or two element-system multiple oxide of Ti and Zr is especially more desirable.

Although the content in particular of the titanium (Ti) occupied in a titanium-vanadium catalyst is not limited, it is desirable, as an oxide reduced mass ratio to the total mass of a titanium-vanadium catalyst, 15-9.9 mass percent, for example, and 30-99 mass percent is more desirable. Sufficient effect may not be acquired by lowering of a specific surface area etc. in case of under 15 mass percent, and on the other hand, when 99.9 mass percent is exceeded, there is a possibility that sufficient catalytic activity may not be acquired.

Although the rate in particular of at least one sort of metallic oxides chosen from the group which consists of vanadium (V), tungsten (W) and molybdenum (Mo) is not limited, it is, as an oxide reduced mass ratio to the total amount of a titanium-vanadium catalyst, 0.5-30 mass percent, and preferably 1-20 mass percent. There will be a possibility that sufficient catalytic activity may not be acquired as it is under 0.5 mass percent, and on the other hand, if 30 mass percent is exceeded, agglomeration of a catalyst component takes place, and while there is a possibility that sufficient performance may not be obtained, the cost of the catalyst itself will become high and will lead to the jump of exhaust-gas-treatment cost.

As a noble-metal catalyst laminated downstream of a titanium-vanadium catalyst, an oxidation catalyst with at least one sort of noble metals chosen from platinum, palladium, rhodium and ruthenium and/or the compound of those is used. This catalyst can use a carrier suitably, for example, platinum etc. for a carrier, and alumina, silica, zirconia, titania, vanadia, ferrous oxide, manganese oxide, and these mixtures and multiple oxides can be used as a carrier. Moreover, the titanium-vanadium catalyst can also be used as a carrier.

The example of preparation of a noble-metal catalyst is shown below. To the titanium-vanadium catalyst powder or slurry, the salts of these noble metals, or its solution can be added, for example. Moreover, making it impregnated can perform support of at least one sort of noble metals chosen from platinum, palladium, rhodium and ruthenium and/or its compound component, and this impregnating support is more desirable.

In a noble-metal catalyst, noble metal and/or its compound to a carrier, as a metal, is 0.001 to 5 mass percent, more preferably 0.05-2.5 mass percent. If it is under 0.001 mass percent, the decomposition activity of a volatile organic compound becomes low, and when it exceeds 5 mass percent, the activity corresponding to the addition is not acquired and not desirable.

Moreover, in the above-mentioned oxide catalyst and noble-metal catalyst which are used for the catalyst device 12, alumina, silica, silica alumina, cordierite, titania, stainless steel, metal, etc. may be supported and used for the carrier of plainer shape, the shape of a corrugated plate, tabular shape, the shape of a net, the shape of a honeycomb, the shape of a column and cylindrical shape.

As a preparing method of the catalyst, there is no restraint in particular, for example, conventionally publicly known methods, such as a sedimentation (coprecipitation method), self-possessed method, and kneading method, can be adopted. For example, the binary system multiple oxide containing titanium oxide and one or more sorts chosen from silicon (Si) and zirconium (Zr), titanium oxide, or the mixtures of titanium oxide and one or more sorts of oxide chosen from silicon (Si) and zirconium (Zr) is made into a titanium component; to the powder of this titanium component, the water solution that includes the source of vanadium is added with the organic or inorganic forming assistant generally used at this kind of fabrication; then it is heated while being mixed and kneaded to evaporate its moisture and to be pasty to an extent that extrusion is possible; it is fabricated with an extruder in the shape of a honeycomb etc.; and it is dried and calcined at an elevated temperature (preferably 200-600° C.) in the air.

Moreover, as another method, it is possible to prepare the catalysis by fabricating the titanium component in forms such as a spherical pellet, a cylindrical pellet or a cancellous honeycomb beforehand; calcinating the titanium component; and carrying out impregnating support of the water solution including the source of vanadium. Further, it is possible to prepare the catalysis by directly kneading the powder of the titanium component to the powder of vanadium oxide.

Although the catalyst used with the catalyst device 12 is not limited in particular for BET surface area, it is desirable to be 20-300 $m^2/g$, more preferably 30-250 $m^2/g$, and the catalyst with such BET surface area is high in activity, and excellent in durability. Moreover, when the pore volume by a method of mercury penetration is too small, the catalytic activity and durability for clearance of the harmful substances of the object of this invention such as NOx, persistent organic pollutants, a volatile organic compound and CO become low, and when the mercury penetration is too large, the strength of the catalyst will fall, so that the pore volume of the catalyst is preferably between 0.3 to 0.55 cc/g.

The shape of the above-mentioned oxide catalyst and the noble-metal catalyst is not limited in particular, and it can be used as a preferable form of the shape of a honeycomb, plainer shape, the shape of a net, the shape of a column, cylindrical shape and so on.

As for the catalyst temperature of the catalyst device from which the target harmful substance is removed, 140° C. or more are desirable, and 180° C. or more is more preferable. It is because when the temperature of the catalyst is less than 140° C., denitration efficiency and the decomposition efficiency of a volatile organic compound become low.

Although the space velocity of the exhaust gas in the above-mentioned oxide catalyst and the noble-metal catalyst is not restricted in particular, it is preferably 100-100000 h$^{-1}$ and more preferably 200-50000 h$^{-1}$. When the space velocity is less than 100 h$^{-1}$, a device becomes large too much, which becomes inefficient, and on the other hand, when 100000 h$^{-1}$ is exceeded, there is an inclination for the denitration efficiency and the decomposition efficiency of a volatile organic compound to fall.

Although the above-mentioned statement mainly explained the device with the titanium-vanadium catalyst and plurality of catalysts, if an effect is demonstrated in the exhaust gas treatment concerning this invention, it cannot be limited to the catalyst of a titanium-vanadium but the device with one catalyst or more can be used, and it is a matter of course that a service condition is not restricted.

Next, it returns to the explanation of the flow shown in FIG. 1. The solid-liquid separator 16 is installed to carry out solid-liquid separation of the slurry discharged from the wet dust collector 7, and a filter press or the like may be used for it.

The mercury-adsorbing tower 17 is installed to adsorb mercury in the fluid separated with the solid-liquid separator 16. A part of the wastewater W of the mercury-adsorbing tower 17 is supplied to the sodium hypochlorite generator 9, and it is used to generate sodium hypochlorite.

Next, the action of the combustion exhaust gas processing device with the above-mentioned construction will be explained with reference to FIG. 1.

The combustion exhaust gas G1 from the cement kiln 4 desulfurized in the preheater 2 is introduced into the electrostatic precipitator 6, and dust in the combustion exhaust gas G1 is collected. The combustion exhaust gas G2 which passed the electrostatic precipitator 6 is introduced into the wet dust collector 7, and the water-soluble materials and dust in the combustion exhaust gas G2 are collected to remove catalyst-poisoning substances which have big effect on the life of the latter catalyst device 12, such as dust, sulfuric acid mist, hydrogen chloride (HCl) and mercury (Hg). In this connection, the temperature of the combustion exhaust gas G2 is controlled to become approximately 100° C.

The slurry generated at the wet dust collector 7 circulates through the circulating liquid tank 7a and the pump 8, which allows the contact between the combustion exhaust gas G2 and the fluid to be performed sufficiently, and allows the oxidation of mercury and the like by the sodium hypochlorite supplied from the sodium hypochlorite generator 9 and the recovery of water-soluble materials and dust to be performed efficiently. In addition, in the wet dust collector 7, while circulating water, a part of the water is extracted so as to be supplied to the solid-liquid separator 16, but this circulating water is discharged to the grade that does not pose a problem.

The combustion exhaust gas G3 of approximately 80° C. from which catalyst-poisoning substances, such as water-soluble materials and dust, are removed, is introduced from the circulating liquid tank 7a to the heat exchanger 10 and the heater 11, and is heated there. The combustion exhaust gas G3 is heated because it is desirable to perform denitration of the combustion exhaust gas G4 and decomposition of persistent organic pollutants in the catalyst device 12 at 140-500° C. as mentioned above, and when the decomposition performance and the durability of a catalyst are taken into consideration, it is desirable to decompose at approximately 230-270° C.

The combustion exhaust gas G5 discharged from the catalyst device 12 is used for the heat source of the heat exchanger 10. The heat exchange of the combustion exhaust gas G5 discharged from the catalyst device 12 is carried out with the combustion exhaust gas G3 introduced from the wet dust collector 7 in the heat exchanger 10. Since the temperature increase of the combustion exhaust gas G4 cannot fully be performed only by the heat exchange in the heat exchanger 10, auxiliary steam ST is introduced into the heater 11, and the combustion exhaust gas G4 is heated further. The steam with remaining heat or the like in the plant in which the cement burning facility 1 is installed can be used for this auxiliary steam ST.

Moreover, ammonia (NH$_3$) as a denitration agent used in the catalyst device 12 is injected into the entrance side of the heater 11. The injection rate of the ammonia is controlled according to the NOx concentration of the combustion exhaust gas G1 discharged from the preheater 2. In addition, as stated above, ammonia can be added to a portion between the outlet of the wet dust collector 7 and the inlet of the catalyst device 12, where the mixing effect is available other than the entrance side of the heater 11. It is possible to add aqueous ammonia to the combustion exhaust gas after pre-heating with the heater 11 and to allow the gas to pass the catalyst device 12.

Next, the combustion exhaust gas G4 is supplied to the catalyst device 12, and NOx, persistent organic pollutants, a volatile organic compound, CO, etc. are removed through decomposition and so on. As mentioned above, the temperature in the catalyst device 12 is controlled at 140-500° C. preferably 230-270° C. which is suitable for denitration of combustion exhaust gas G and decomposition of persistent organic pollutants. Here, since the heat exchanger 10 is arranged, it is possible to control the temperature in the catalyst device 12 highly, and raising the operating temperature of the catalyst device 12 as much as possible allows the efficiency of the catalyst device 12 to rise, which can reduce the amount of the catalyst.

The combustion exhaust gas G5 from the catalyst device 12 is emitted to the air through the heat exchanger 10, the fan 14 and the stack 15. The temperature of the combustion exhaust gas G6 becomes approximately 110° C. due to the recovery of its remaining heat.

Meanwhile, the slurry S discharged from the circulating liquid tank 7a is solid-liquid separated by the solid-liquid separator 16, and the cake C separated is used as a cement raw material. On the other hand, mercury in the fluid separated by the solid-liquid separator 16 dissolves in water as a chloro-complex ion (HgCl$_4^{2-}$), and this ion is adsorbed by the mercury-adsorbing tower 17. As to the mercury, it is possible to solid-separate as (HgCl$_2$), and then ion may be adsorbed and separated. Some wastewater W from which mercury is removed is supplied to the sodium hypochlorite generator 9, others can be processed out of the system or it can also use them for the cooling of the combustion exhaust gas G1 of the cement kiln 4, a water spray of a cement raw material mill or a dryer for a cement raw material and so on.

Embodiment 1

Next, as the first embodiment of the device and method for processing cement kiln combustion exhaust gas according to the present invention, each harmful-substance-elimination factor, using the combustion-exhaust-gas processing device with the construction shown in FIG. 1 and a titanium-vanadium catalyst for the catalyst device 12, is shown in Table 1. In this test, the combustion-exhaust-gas temperature at the inlet of the catalyst device 12 was 180° C., and space velocity (SV value) was set to be 5060 h$^{-1}$. In addition, the harmful-substance-elimination factor is computed using the concentration of each harmful substance of the outlet of the electrostatic precipitator 6, and the concentration of each harmful substance of the outlet of the catalyst device 12. That is, the rate that the catalyst device 12 removes each harmful substance in the outlet of the electrostatic precipitator 6 is shown.

TABLE 1

| Harmful substances | Elimination factor (%) |
|---|---|
| Nox | 97 |
| Persistent organic pollutants | 86 |
| Mercury (Hg) | 97 |
| Smoke dust | 90 |
| Ammonia (NH3) | 84 |
| Odor | 90 |
| PCB | 92 |

As shown in Table 1, it is possible to efficiently remove harmful substances, such as NOx, persistent organic pollutants, a volatile organic compound, dust, and PCB, by this invention.

Embodiment 2

Next, as the second embodiment of the device and method for processing cement kiln combustion exhaust gas according to the present invention, each harmful-substance-elimination factor, using the combustion-exhaust-gas processing device with the construction shown in FIG. 1 and at the time of arranging a titanium-vanadium catalyst (oxide catalyst) upstream, and platinum catalyst (noble-metal catalyst) downstream at the catalyst device 12, is shown in Table 2.

This test was carried out under the condition that the combustion-exhaust-gas temperature at the inlet of the catalyst device 12 was 180° C., 210° C. and 250° C. Moreover, space velocity (SV value) was set to be 5,060 $h^{-1}$ by the titanium-vanadium catalyst, and 24,200 $h^{-1}$ by the platinum catalyst. The reducing agent ($NH_3$ gas) was sprayed upstream of the catalyst device, and the mole ratio of NOx and $NH_3$ was set to be 1. In this connection, the harmful-substance-elimination factor is computed using each harmful substance concentration of the outlet of the electrostatic precipitator 6, and the concentration of each harmful substance of the outlet of the catalyst device 12. That is, the rate that the catalyst device 12 removed each harmful substance in the outlet of the electrostatic precipitator 6 is shown.

Further, as a comparative example 1, the form, which has arranged the platinum catalyst upstream, and has arranged the titanium-vanadium catalyst downstream at the catalyst device 12, under the same other conditions as the Embodiment 2, was tested.

TABLE 2

| | Embodiment 2 | | | Comparative example 1 | | |
|---|---|---|---|---|---|---|
| | Gas temperature | | | | | |
| Harmful substances | 180° C. | 210° C. | 250° C. | 180° C. | 210° C. | 250° C. |
| | Eliminaition factor (%) | | | Eliminaition factor (%) | | |
| Nox | 97 | 98 | 99 | 97 | 75 | 20 |
| Persistent organic pollutants | 89 | 92 | 93 | 89 | 92 | 93 |
| Mercury (Hg) | 97 | 97 | 97 | 97 | 97 | 97 |
| Smoke dust | 90 | 90 | 90 | 90 | 90 | 90 |
| Ammonia (NH3) | 97 | 98 | 99 | 97 | 98 | 99 |
| Odor | 95 | 98 | 99 | 95 | 85 | 70 |
| PCB | 95 | 98 | 99 | 95 | 98 | 99 |
| CO | 98 | 99 | 99 | 98 | 99 | 99 |

Embodiment 2→Upstream: Oxidation catalyst, Downstream: Noble-metal catalyst
Comparative example 1→Upstream: Noble-metal catalyst, Downstream: Oxidation catalyst As shown in Table 2, by using a platinum catalyst together, most COs is removable while being able to raise the elimination factor of ammonia further. However, it is more desirable to install an oxide catalyst upstream and to install a noble-metal catalyst downstream like the Embodiment 2 of this invention, since the elimination factor falls also about an odor in the comparative example 1 while the elimination factor of NOx falls substantially when the combustion-exhaust-gas temperature of the inlet of the catalyst device 12 is 250° C.

As mentioned above, as an arrangement form of the catalyst of the catalyst device 12, independently installed oxide catalyst in the upstream is preferably effective. Moreover, further excellent effect is acquired by making it the two steps of catalyst system with upstream oxide catalyst and downstream noble-metal catalyst, and it is still more desirable.

In an oxide independent system, the decomposition clearance of NOx, a volatile organic compound, and persistent organic pollutants, which are the harmful substances in exhaust gas, is attained. Moreover, when the upstream is equipped with an oxide catalyst, the downstream is equipped with a noble-metal catalyst to form a two-step catalyst system, the decomposition clearance of NOx, a volatile organic compound, and persistent organic pollutants, which are the harmful substances in exhaust gas, is attained; the decomposition clearance of CO is attained simultaneously; and the decomposition performance of the volatile organic compound is also improved, resulting in further excellent effect.

Further, although it becomes possible to carry out decomposition clearance of the NOx by spraying ammonia gas in the process in which NOx is removed with an upper catalyst, in case that ammonia without reaction remains at the upstream catalyst and it emits to the air as it is, it may become the origin of a secondary environmental pollution. In order to prevent this, in ammonia injection control, it is necessary to perform close control to avoid the problem. In this connection, with two-step catalyst system that equipped with an upstream oxide catalyst and a downstream noble-metal catalyst, the downstream catalyst attains decomposition clearance of ammonia without reaction; precise control is unnecessary; and the secondary environmental pollution by ammonia can be suppressed.

Embodiment 3

Next, as the third embodiment of the device and method for processing cement kiln combustion exhaust gas according to the present invention, each harmful-substance-elimination factor, using the combustion-exhaust-gas processing device with the construction shown in FIG. 1 and the time of arranging a titanium-vanadium catalyst (oxide catalyst) upstream, and platinum catalyst (noble-metal catalyst) downstream at the catalyst device 12, is shown in Table 3.

Figure 3:
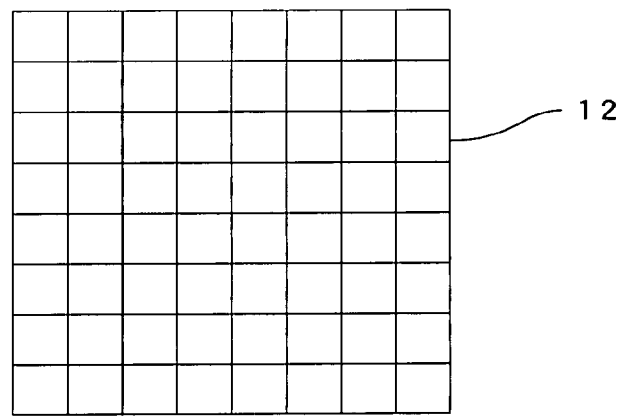
FIGS. 3(a) and 3(b) comprise schematic diagrams for explaining the mesh size of a catalyst (bore diameter of a catalyst) of a honeycomb catalyst, in which (b) is an enlarged view of (a).
Figure 3:
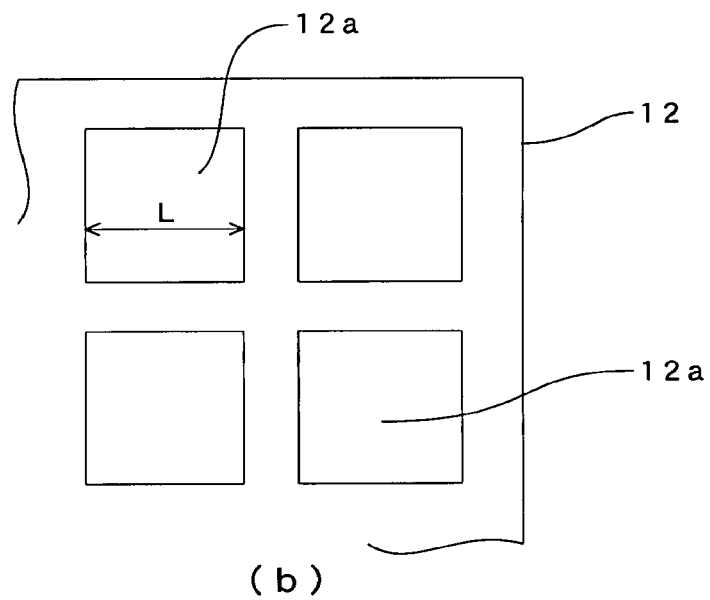

In this test, the temperature of combustion exhaust gas at the inlet of the catalyst device 12 was 180° C. Space velocity (SV value) was set to be 5,060 h$^{-1}$ for the titanium-vanadium catalyst, and 24,200 h$^{-1}$ for the platinum catalyst. As for the mesh size (bore diameter) of the catalyst, a 2.9 mm honeycomb catalyst for the titanium-vanadium catalyst was used and a 1.77 mm honeycomb catalyst for the platinum catalyst. The reducing agent (NH$_3$ gas) was sprayed upstream of the catalyst device, and set the mole ratio of NOx and NH$_3$ was set to be 1. In this connection, the mesh size (bore diameter) of a catalyst means, as shown in FIG. 3, the dimension L from the left end to the right end of the hole (a square shape) 12a through which the exhaust gas of the honeycomb-like catalyst 12 passes. Moreover, to the wet dust collector 7 in FIG. 1, sodium hypochlorite of which concentration was 2 mg/kg-H$_2$O was added. The elimination factor and durability of each harmful substance are shown in Table 3.

Further, as a comparative example 2, the process shown in FIG. 1 without wet dust collector under the same conditions of the arrangement, the mesh size of catalyst and others as the Embodiment 3, was tested.

TABLE 3

| Harmful substances | Initial elimination factor (%) | 1000 hours after elimination factor (%) |
|---|---|---|
| | Embodiment 3 | |
| Nox | 97 | 96 |
| Persistent organic pollutants | 89 | 89 |
| Mercury (Hg) | 97 | 97 |
| Smoke dust | 90 | 90 |
| Ammonia (NH3) | 97 | 96 |
| Odor | 95 | 95 |
| PCB | 95 | 95 |
| CO | 98 | 96 |
| | Comparative example 2 | |
| NOX | 97 | 90 |
| Persistent organic pollutants | 89 | 82 |
| Mercury (Hg) | 0 | 0 |
| Smoke dust | 0 | 0 |
| Ammonia (NH3) | 97 | 90 |
| Odor | 95 | 70 |
| PCB | 95 | 88 |
| CO | 98 | 70 |

As clearly shown in the table, by the comparative example 2, although mercury and smoke dust cannot be removed, and the initial elimination factor is the same as that of Embodiment 3 also about other harmful substances, the elimination factor after 1000 hours falls from Embodiment 3, and it turns out that it is inferior in durability.

In addition, in the above-mentioned embodiment, although the wet dust collector 7 which adds sodium hypochlorite to the combustion exhaust gas G2 was used as a catalyst-poisoning-substance stripper, a bag filter for which dust is collected while blowing activated carbon into the combustion exhaust gas G2 can also be used. With the activated carbon, dust, mercury and SOx are efficiently removable.

| Explanation Of Reference Numbers | |
|---|---|
| 1 | cement burning facility |
| 2 | preheater |
| 3 | calciner |
| 4 | cement kiln |
| 5 | clinker cooler |
| 6 | electrostatic precipitator |
| 7 | wet dust collector |

-continued

| Explanation Of Reference Numbers | |
|---|---|
| 7a | circulating liquid tank |
| 8 | pump |
| 9 | sodium hypochlorite generator |
| 10 | heat exchanger |
| 11 | heater |
| 12 | catalyst device |
| 12a | hole through which exhaust gas passes |
| 14 | fan |
| 15 | stack |
| 16 | solid-liquid separator |
| 17 | mercury adsorbing tower |

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

The invention claimed is:

1. A device for processing cement kiln combustion exhaust gas comprising:
   a dust collector configured to collect dust in cement kiln combustion exhaust gas;
   a catalyst-poisoning-substance stripper configured to remove a catalyst-poisoning substance and mercury from the cement kiln combustion exhaust gas that passed said dust collector by adding sodium hypochlorite to said cement kiln combustion exhaust gas;
   a heater downstream of the catalyst-poisoning-substance stripper and configured to heat the cement kiln combustion exhaust gas that passed said catalyst poisoning substance stripper;
   a catalyst device configured to remove at least one member selected from the group consisting of a volatile organic compound, carbon monoxide, a persistent organic pollutant, hydrocarbon and an offensive odor substance in the cement kiln combustion exhaust gas heated by said heater; and
   a mercury adsorbing tower which adsorbs mercury in liquid exhausted from the catalyst-poisoning substance stripper, the mercury adsorbing tower producing wastewater, wherein a portion of the wastewater is used to generate sodium hypochlorite.

2. The device for processing cement kiln combustion exhaust gas as claimed in claim 1, wherein nitrogen oxide in the cement kiln combustion exhaust gas heated by the heater is removed together with at least one a volatile organic compound, carbon monoxide, a persistent organic pollutant, hydrocarbon and an offensive odor substance.

3. The device for processing cement kiln combustion exhaust gas as claimed in claim 1, wherein said catalyst-poisoning-substance stripper is a wet dust collector that removes the catalyst-poisoning substance from the cement kiln combustion exhaust gas.

4. The device for processing cement kiln combustion exhaust gas as claimed in claim 1, wherein concentration of said sodium hypochlorite is in a range of 1 mg/L or in more and 1.000 mg/L or less.

5. The device for processing cement kiln combustion exhaust gas as claimed in claim 1, wherein said catalyst device is provided with an oxide catalyst installed in an upstream side and a noble-metal catalyst installed in a downstream side.

6. The device for processing cement kiln combustion exhaust gas as claimed in claim 5, wherein a reducing agent is sprayed from an entrance-side upper part of said catalyst device.

7. The device for processing cement kiln combustion exhaust gas as claimed in claim 5, wherein said oxide catalyst is a titanium-vanadium catalyst.

8. The device for processing cement kiln combustion exhaust gas as claimed in claim 7, wherein a mesh size (bore diameter) of said catalyst is in a range of 1.75 mm or more and 3.75 mm or less.

9. The device for processing cement kiln combustion exhaust gas as claimed in claim 5, wherein said noble-metal catalyst is a catalyst having at least one noble metal selected from platinum, palladium, rhodium and ruthenium.

10. The device for processing cement kiln combustion exhaust gas as claimed in claim 9, wherein a mesh size (bore diameter) of said catalyst is in a range of 1.75 mm or more and 3.75 mm or less.

11. The device for processing cement kiln combustion exhaust gas as claimed in claim 1, wherein said heater is a Ljungstrom-type heat exchanger, a heat pump or a heat pipe.

12. The device for processing cement kiln combustion exhaust gas as claimed in claim 1, further comprising a solid-liquid separator in fluid communication with the catalyst-poisoning-substance stripper and configured to separate discharge of the catalyst-poisoning-substance stripper into solid and liquid components, the liquid component being fed to the mercury adsorbing tower.

13. The device for processing cement kiln combustion exhaust gas as claimed in claim 12, further comprising a sodium hypochlorite generator in fluid communication with the catalyst-poisoning-substance stripper and the mercury adsorbing tower, the sodium hypochlorite generator being configured to use the wastewater from the mercury adsorbing tower to generate sodium hypochlorite and supply sodium hypochlorite to the catalyst-poisoning-substance stripper.

\* \* \* \* \*